United States Patent
Liu et al.

(10) Patent No.: US 10,700,828 B2
(45) Date of Patent: Jun. 30, 2020

(54) DATA FRAME IMPLEMENTATION METHOD AND APPARATUS

(71) Applicant: HUAWEI TECHNOLOGIES CO., LTD., Shenzhen, Guangdong (CN)

(72) Inventors: Jin Liu, Shenzhen (CN); Dageng Chen, Shanghai (CN); Xiaoyan Bi, Shanghai (CN); Yan Chen, Shanghai (CN)

(73) Assignee: HUAWEI TECHNOLOGIES CO., LTD., Shenzhen, Guangdong (CN)

( * ) Notice: Subject to any disclaimer, the term of this patent is extended or adjusted under 35 U.S.C. 154(b) by 58 days.

(21) Appl. No.: 15/995,057

(22) Filed: May 31, 2018

(65) Prior Publication Data

US 2018/0278388 A1 Sep. 27, 2018

Related U.S. Application Data

(63) Continuation of application No. PCT/CN2016/106457, filed on Nov. 18, 2016.

(30) Foreign Application Priority Data

Dec. 22, 2015 (CN) .......................... 2015 1 0970365

(51) Int. Cl.
*H04L 5/00* (2006.01)
*H04L 27/26* (2006.01)
*H04L 1/00* (2006.01)

(52) U.S. Cl.
CPC ............ *H04L 5/0044* (2013.01); *H04L 1/003* (2013.01); *H04L 27/26* (2013.01); *H04L 27/2602* (2013.01)

(58) Field of Classification Search
CPC ... H04L 5/0044; H04L 5/0041; H04L 5/0094; H04L 27/2602; H04L 27/26; H04L 1/003;
(Continued)

(56) References Cited

U.S. PATENT DOCUMENTS

2005/0180313 A1 8/2005 Kim et al.
2007/0155387 A1 7/2007 Li et al.
(Continued)

FOREIGN PATENT DOCUMENTS

CN 1655543 A 8/2005
CN 101166053 A 4/2008
(Continued)

OTHER PUBLICATIONS

XP055268339 John Smee et al.,"5G Vision and Design", IEEE 5G Summit Silicon Valley, Qualcomm, Nov. 16, 2015, 22 pages.

*Primary Examiner* — Mohamed A Kamara
(74) *Attorney, Agent, or Firm* — Womble Bond Dickinson (US) LLP

(57) ABSTRACT

Embodiments of the present application disclose data frame implementation methods and apparatus. In one embodiment, a method includes: configuring a data frame used for radio signal transmission, where the data frame includes at least two subframes, each subframe has a fixed length, the at least two subframes may be mapped to at least two frequency bands with different subcarrier spacings, and a quantity of symbols included in each subframe is corresponding to a subcarrier spacing of a frequency band to which the subframe is mapped. According to embodiments of the present application, various service requirements of 5G mobile communication can be met and a service level of the 5G mobile communication can be improved.

20 Claims, 7 Drawing Sheets

(58) Field of Classification Search
CPC ... H04L 5/0007; H04L 51/066; H04W 28/065
See application file for complete search history.

(56) References Cited

U.S. PATENT DOCUMENTS

| | | | |
|---|---|---|---|
| 2015/0256308 A1* | 9/2015 | Ma | H04L 5/0035 |
| | | | 370/330 |
| 2017/0164350 A1* | 6/2017 | Sun | H04L 5/0007 |
| 2018/0091267 A1* | 3/2018 | Kim | H04L 5/0007 |
| 2018/0248616 A1* | 8/2018 | Tiirola | H04B 7/2656 |
| 2018/0279388 A1* | 9/2018 | Miao | H04W 76/10 |
| 2018/0302254 A1* | 10/2018 | Yamada | H04L 27/2607 |

FOREIGN PATENT DOCUMENTS

| | | |
|---|---|---|
| CN | 101577690 A | 11/2009 |
| CN | 103825671 A | 5/2014 |
| EP | 1538802 A2 | 6/2005 |
| EP | 2597802 A1 | 5/2013 |

* cited by examiner

Configure a data frame used for radio signal transmission, where the data frame includes at least two subframes, each subframe has a fixed length, the at least two subframes may be mapped to at least two frequency bands with different subcarrier spacings, and a quantity of symbols included in each subframe is corresponding to a subcarrier spacing of a frequency band to which the subframe is mapped — 101

FIG. 1

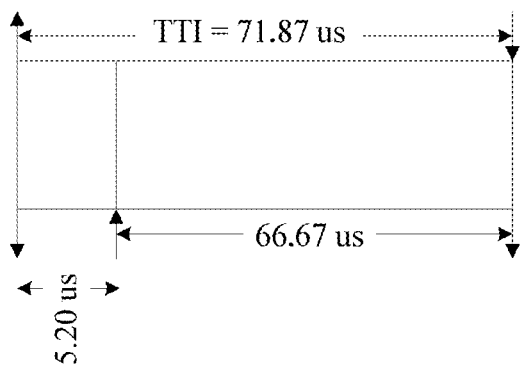

FIG. 2

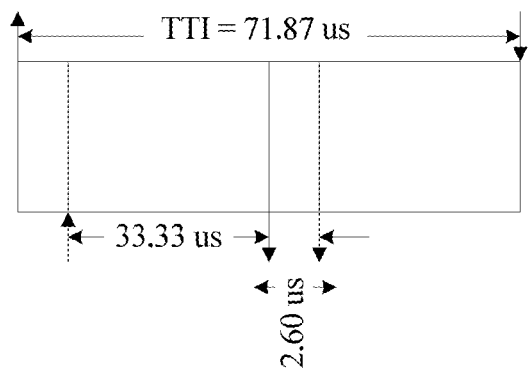

FIG. 3

|  | $\Delta f$ | Tu | FFT size | | | Symbol/TTI | CP length | CP overhead |
| --- | --- | --- | --- | --- | --- | --- | --- | --- |
|  |  |  | 20 MHz | 40 MHz | 100 MHz |  |  |  |
| Option 1 | 15 kHz | 66.67 us | 2048 | 4096 | 8192 | 1 | 5.2 us | 6~7% |
| Option 2 | 30 kHz | 33.33 us | 1024 | 2048 | 4096 | 2 | 2.6 us | 6~7% |
| Option 3 | 60 kHz | 16.67 us | 512 | 1024 | 2048 | 3 | 1.3 us | 6~7% |

FIG. 5

☐ First subframe (ultra-short TTI, 15, 30, and 60 kHz, a low transmission latency, and critical MTC)

☐ Second subframe (normal transmission, 15, 30, and 60 kHz, a high capacity, and high mobility)

◩ Third subframe (long TTI, 15, 30, and 60 kHz, and a high capacity)

☐ Fourth subframe (ultra-narrowband, 15, 30, and 60 kHz, small packet, and a massive connection)

DATA FRAME IMPLEMENTATION METHOD AND APPARATUS

CROSS-REFERENCE TO RELATED APPLICATIONS

This application is a continuation of International Application No. PCT/CN2016/106457, filed on Nov. 18, 2016, which claims priority to Chinese Patent Application No. 201510970365.1, filed on Dec. 22, 2015. The disclosures of the aforementioned applications are hereby incorporated by reference in their entireties.

TECHNICAL FIELD

The present application relates to the communications field, and in particular, to a data frame implementation method and apparatus.

BACKGROUND

Currently, with development of communications technologies and growth of user requirements, 5G mobile communication has become a research focus in the communications industry. In addition to supporting conventional telecommunications services, the 5G mobile communication further needs to adapt to rapid development of the mobile Internet and Internet of Things service in the future. Therefore, various service requirements are proposed on the 5G mobile communication in the communications industry, including key performance requirements, such as a high capacity, a low latency, a massive connection, high reliability, and high mobility. Requirements of various services on a system parameter are inconsistent or even mutually exclusive. For example, a high-mobility needs a relatively wide subcarrier spacing to resist a relatively high Doppler spread (Doppler Spread). However, to serve a remote user, a relatively narrow subcarrier spacing needs to be designed to ensure an effective coherent bandwidth (Coherent Bandwidth). However, subframes in a current mobile communications system have an identical data structure, such as an equal subframe length, an equal quantity of symbols, and an equal subcarrier spacing, and both sampling frequencies and FFT sizes of the subframes are equal for equal transmission bandwidths. It can be learned that a single feature of a subframe in the current mobile communications system cannot meet various service requirements of the 5G mobile communication, and consequently, a service level of the 5G mobile communication is extremely low.

SUMMARY

Embodiments of the present application provide a data frame implementation method and apparatus, so as to meet various service requirements of 5G mobile communication and improve a service level of the 5G mobile communication.

According to a first aspect, an embodiment of the present application provides a data frame implementation method, including:

configuring a data frame used for radio signal transmission, where the data frame includes at least two subframes, each subframe has a fixed length, the at least two subframes may be mapped to at least two frequency bands with different subcarrier spacings, and a quantity of symbols included in each subframe is corresponding to a subcarrier spacing of a frequency band to which the subframe is mapped.

In one embodiment, the foregoing data frame may be mapped to the at least two frequency bands with different subcarrier spacings, and a quantity of symbols included in each subframe is corresponding to a subcarrier spacing of a frequency band to which the subframe is mapped. In this way, the data frame can meet various service requirements of the 5G mobile communication and improve the service level of the 5G mobile communication.

In one embodiment, the foregoing at least two subframes may include a first subframe of a first length;

when the first subframe is mapped to a frequency band with a first subcarrier spacing, the first subframe includes at least one symbol; and when the first subframe is mapped to a frequency band with a second subcarrier spacing, the first subframe includes at least two symbols, and the second subcarrier spacing is greater than the first subcarrier spacing.

In one embodiment, when the first subframe is mapped to frequency bands with different subcarrier spacings, a quantity of symbols included in the first subframe may be different, thereby meeting various service requirements of the 5G mobile communication.

In one embodiment, the at least two subframes may include a second subframe of a second length, where the second length is N times the first length, and N is a positive integer greater than 1;

when the second subframe is mapped to the frequency band with the first subcarrier spacing, the second subframe includes at least N symbols; and when the second subframe is mapped to the frequency band with the second subcarrier spacing, the second subframe includes at least 2N symbols.

In this embodiment, the length of the second subframe is N times the length of the first subframe. In this way, the first subframe and the second subframe may be flexibly assembled, so as to be mapped to different frequency bands.

In one embodiment, a quantity of symbols included in each subframe may be directly proportional to a subcarrier spacing of a frequency band to which the subframe is mapped.

In this embodiment, a quantity of symbols included in each subframe is directly proportional to a subcarrier spacing of a frequency band to which the subframe is mapped. In this way, subframes can be more flexibly configured as a data frame, so as to better meet various service requirements of the 5G mobile communication.

In one embodiment, the at least two subframes may include a third subframe of a third length, where the third length is M×N times the first length, and M and N are positive integers greater than 1; or the at least two subframes may include a fourth subframe of a fourth length, where the fourth length is K×M×N times the first length, and K, M, and N are all positive integers greater than 1.

In this embodiment, lengths of the third subframe and the fourth subframe are multiples of lengths of the first subframe and the second subframe. In this way, the data frame is more flexibly assembled for meeting different service requirements.

In one embodiment, configuring a data frame used for radio signal transmission may include:

configuring a data frame that is used for radio signal transmission and that is mapped to a target frequency band, where the data frame includes at least one of the following:

the first subframe, the second subframe, the third subframe, or the fourth subframe; and a subcarrier spacing of the target frequency band includes any one of the following:

the first subcarrier spacing, the second subcarrier spacing, a third subcarrier spacing, a fourth subcarrier spacing, or a fifth subcarrier spacing, where the third subcarrier spacing is greater than the second subcarrier spacing, the fourth subcarrier spacing is greater than the third subcarrier spacing, and the fifth subcarrier spacing is less than the first subcarrier spacing.

In this embodiment, the data frame may be mapped to frequency bands with different subcarrier spacings, and the data frame may be flexibly assembled for meeting various service requirements of the 5G mobile communication.

In one embodiment, the subframes included in the data frame may be combined in a first combination manner, or the subframes included in the data frame may be combined in a second combination manner; where the first combination manner is different from the second combination manner.

In this embodiment, the subframes in the data frame may be combined in different combination manners for being applicable to different scenarios and different services.

In one embodiment, a combination manner of the subframes included in the foregoing data frame may be dynamically specified by a control signal or may be specified by higher layer signaling; or a combination manner of the subframes included in the data frame is negotiated in advance with a receiver.

In this embodiment, the combination manner of the subframes included in the data frame is dynamically specified by the control signal or is specified by the higher layer signaling. Therefore, the subframes in the data frame may be flexibly combined, so as to better meet various service requirements of the 5G mobile communication. In addition, in this embodiment, the combination manner of the subframes in the data frame may be negotiated in advance with the receiver. In this way, an extra control signal or extra higher layer signaling does not need to be transmitted during transmission, thereby saving network transmission resources.

In one embodiment, the data frame is further used to transmit at least one of the following:

broadcast signaling, common control information, or a synchronization signal.

In one embodiment, the method may further include:

sending the data frame to a receiver.

According to a second aspect, an embodiment of the present application provides a data frame implementation method, including:

receiving a data frame sent by a transmitter, where the data frame includes at least two subframes, each subframe has a fixed length, the at least two subframes may be mapped to at least two frequency bands with different subcarrier spacings, and a quantity of symbols included in each subframe is corresponding to a subcarrier spacing of a frequency band to which the subframe is mapped.

In one embodiment, the at least two subframes include a first subframe of a first length;

when the first subframe is mapped to a frequency band with a first subcarrier spacing, the first subframe includes at least one symbol; and when the first subframe is mapped to a frequency band with a second subcarrier spacing, the first subframe includes at least two symbols, and the second subcarrier spacing is greater than the first subcarrier spacing.

In one embodiment, the at least two subframes include a second subframe of a second length, where the second length is N times the first length, and N is a positive integer greater than 1;

when the second subframe is mapped to the frequency band with the first subcarrier spacing, the second subframe includes at least N symbols; and when the second subframe is mapped to the frequency band with the second subcarrier spacing, the second subframe includes at least 2N symbols.

In one embodiment, a quantity of symbols included in each subframe is directly proportional to a subcarrier spacing of a frequency band to which the subframe is mapped.

In one embodiment, the at least two subframes include a third subframe of a third length, where the third length is M×N times the first length, and M and N are positive integers greater than 1; or the at least two subframes include a fourth subframe of a fourth length, where the fourth length is K×M×N times the first length, and K, M, and N are all positive integers greater than 1.

In one embodiment, receiving a data frame sent by a transmitter includes:

receiving the data frame sent by the transmitter on a target frequency band, where the data frame includes at least one of the following:

the first subframe, the second subframe, the third subframe, or the fourth subframe; and a subcarrier spacing of the target frequency band including any one of the following:

the first subcarrier spacing, the second subcarrier spacing, a third subcarrier spacing, a fourth subcarrier spacing, or a fifth subcarrier spacing, where the third subcarrier spacing is greater than the second subcarrier spacing, the fourth subcarrier spacing is greater than the third subcarrier spacing, and the fifth subcarrier spacing is less than the first subcarrier spacing.

In one embodiment, subframes included in the data frame are combined in a first combination manner, or the subframes included in the data frame are combined in a second combination manner; where the first combination manner is different from the second combination.

In one embodiment, a combination manner of the subframes included in the data frame is dynamically specified by a control signal or is specified by higher layer signaling; or a combination of the subframes included in the data frame is negotiated in advance with the transmitter.

In one embodiment, the data frame is further used to transmit at least one of the following:

broadcast signaling, common control information, or a synchronization signal.

According to a third aspect, an embodiment of the present application provides a data frame implementation apparatus, where the apparatus is configured to implement the method and the function provided in the foregoing first aspect, the method and the function are implemented by hardware/software, and the hardware/software includes units corresponding to the foregoing function.

According to a fourth aspect, an embodiment of the present application provides a data frame implementation apparatus, where the apparatus is configured to implement the method and the function provided in the foregoing second aspect, the method and the function are implemented by hardware/software, and the hardware/software includes units corresponding to the foregoing function.

BRIEF DESCRIPTION OF DRAWINGS

To describe the technical solutions in the embodiments of the present application more clearly, the following briefly describes the accompanying drawings required for describing the embodiments. Apparently, the accompanying drawings in the following description show merely some embodiments of the present application, and a person of ordinary skill in the art may still derive other drawings from these accompanying drawings without creative efforts.

FIG. 1 is a schematic flowchart of a data frame implementation method according to an embodiment of the present application;

FIG. 2 to FIG. 4 are schematic structural diagrams of a first subframe according to an embodiment of the present application;

FIG. 5 is a schematic diagram of an effect of a first subframe on different frequency bands according to an embodiment of the present application;

DESCRIPTION OF EMBODIMENTS

Figure 4:
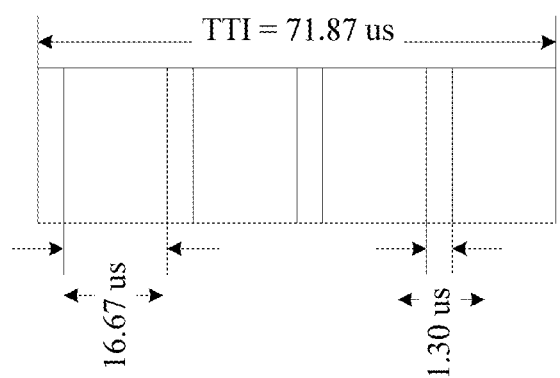

The following clearly describes the technical solutions in the embodiments of the present application with reference to the accompanying drawings in the embodiments of the present application. Apparently, the described embodiments are merely some but not all of the embodiments of the present application. All other embodiments obtained by a person of ordinary skill in the art based on the embodiments of the present application without creative efforts shall fall within the protection scope of the present application.

A data frame implementation method provided in embodiments of the present application may be applied to 5G mobile communication. Various service requirements are proposed on the 5G mobile communication in the communications industry, including key performance requirements such as a high capacity, a low latency, a massive connection, high reliability, and high mobility. Therefore, a data frame used for radio signal transmission is configured in embodiments of the present application. The data frame includes at least two subframes, each subframe has a fixed length, the at least two subframes may be mapped to at least two frequency bands with different subcarrier spacings, and a quantity of symbols included in each subframe is corresponding to a subcarrier spacing of a frequency band to which the subframe is mapped. In this way, in some embodiments of the present application, the data frame may include subframes of different lengths, and consequently, the data frame may transmit different services. In addition, the data frame may be mapped to at least two frequency bands with different subcarrier spacings. In this way, the data frame may be applied to different application scenarios and can meet various service requirements of the 5G mobile communication and improve a service level of the 5G mobile communication.

Referring to FIG. 1, FIG. 1 is a schematic flowchart of a data frame implementation method according to an embodiment of the present application. As shown in FIG. 1, the method includes the following operations:

101. A transmitter configures a data frame used for radio signal transmission, where the data frame includes at least two subframes, each subframe has a fixed length, the at least two subframes may be mapped to at least two frequency bands with different subcarrier spacings, and a quantity of symbols included in each subframe is corresponding to a subcarrier spacing of a frequency band to which the subframe is mapped.

In one embodiment, the foregoing data frame includes at least two subframes may be understood as including two or more subframes. In addition, the subframes included in the data frame may be subframes of different lengths or subframes of a same length.

In addition, in one embodiment, each foregoing subframe has a fixed length may be understood as that a length of each subframe is unchangeable. However, the foregoing data frame may include a plurality of subframes of different lengths, or may include a plurality of subframes of a same length, or may include both subframes of a same length and subframes of different lengths.

In addition, in one embodiment, the foregoing at least two subframes may be mapped to at least two frequency bands with different subcarrier spacings may be understood as the foregoing at least two subframes have a capability of being mapped to at least two frequency bands with different subcarrier spacings, or may be understood as the foregoing at least two subframes are allowed to be mapped to at least two frequency bands with different subcarrier spacings. In this way, the foregoing data frame may be mapped to at least two frequency bands with different subcarrier spacings. For example, the foregoing data frame may be mapped to frequency bands with different subcarrier spacings according to different application scenarios. In addition, the foregoing mapping may be understood as the foregoing at least two subframes may be transmitted on at least two frequency bands with different subcarrier spacings.

In addition, in one embodiment, a quantity of symbols included in each foregoing subframe is corresponding to a subcarrier spacing of a frequency band to which the subframe is mapped may be understood as a quantity of symbols included in each subframe may vary with a subcarrier spacing of a frequency band to which the subframe is mapped. For example, as shown in FIG. 2, when a first subframe in the foregoing data frame is mapped to a frequency band with a 15 kHz subcarrier spacing, the first subframe includes only one symbol, that is, a quantity of symbols of the first subframe is 1. In addition, in this case, the first subframe includes a cyclic prefix (CP). A length of the first subframe is 71.87 μs, or it is understood that a transmission time interval (TTI) of the first subframe is 71.87 μs. A length of the symbol (Symbol) is 66.67 μs, and a length of the CP is 5.20 μs. As shown in FIG. 3, when the first subframe in the foregoing data frame is mapped to a frequency band with a 30 kHz subcarrier spacing, the first subframe includes two symbols, that is, a quantity of symbols of the first subframe is 2. The first subframe includes two CPs, and a length of the first subframe is 71.87 μs. A length of each symbol (Symbol) is 33.33 μs, and a length of each CP is 2.60 μs. As shown in FIG. 4, when the first subframe in the foregoing data frame is mapped to a frequency band with a 60 kHz subcarrier spacing, the first subframe includes four symbols, that is, a quantity of symbols of the first subframe is 4. The first subframe includes four CPs, and a length of the first subframe is 71.87 μs. A length of each symbol (Symbol) is 16.67 μs, and a length of each CP is 1.30 μs.

In one embodiment, the foregoing at least two subframes may include a first subframe of a first length.

When the first subframe is mapped to a frequency band with a first subcarrier spacing, the first subframe includes at least one symbol.

When the first subframe is mapped to a frequency band with a second subcarrier spacing, the first subframe includes at least two symbols, and the second subcarrier spacing is greater than the first subcarrier spacing.

In one embodiment, the foregoing first length may be preset. For example, the first length is set as a product of multiplying a symbol length by a CP length in a 4G; 3G; or 2G system. For example, the first length=TL0=legacy symbol length (Legacy-Symbol) 66.67 μs+legacy CP (Legacy-CP) 5.2 μs=71.87 μs. Certainly, in this embodiment, the foregoing first length may be another length, for example, a length of two TL0s. This is not limited in this embodiment.

Referring to FIG. 2 to FIG. 4, an example in which the first length is 71.87 μs is used for description. In this way, it may be clearly learned from FIG. 2 to FIG. 4 that, when the first subframe is mapped to different frequency bands, quantities of symbols included in the first subframe are different. A length of the first subframe may be set to be relatively short, and therefore, the first subframe may also be defined as an ultra-short subframe in this embodiment. In addition, lengths of a symbol and a CP in the first subframe may be flexibly changed. In this way, longer lengths of a symbol and a CP indicate a higher supportable multipath latency, a larger subcarrier spacing, and a higher tolerable Doppler spread. Therefore, an ultra-short subframe data structure shown in FIG. 2 can meet a low latency requirement in a wide coverage scenario, and an ultra-short subframe data structure shown in FIG. 4 can meet a latency requirement in a high-mobility scenario.

In addition, for the foregoing first subframe, reference may further be made to FIG. 5. FIG. 5 provides parameters of the first subframe in case of different bandwidths. An option 1 represents a scenario shown in FIG. 2, that is, the first subframe is mapped to a frequency band with a 15 kHz subcarrier spacing. An option 2 represents a scenario shown in FIG. 3, that is, the first subframe is mapped to a frequency band with a 30 kHz subcarrier spacing. An option 3 represents a scenario shown in FIG. 4, that is, the first subframe is mapped to a frequency band with a 60 kHz subcarrier spacing. Δf represents a subcarrier spacing, $T_u$ represents a symbol length, and an FFT size Fast Fourier Transform (FFT size). It can be learned from a Table shown in FIG. 5 that, when the first subframe is mapped to different frequency bands, quantities of symbols included in the first subframe can be different, thereby meeting various service requirements of 5G mobile communication. In addition, it can be learned from FIG. 5 that fixed-length frames can have different quantities of symbols but a consistent CP overhead, thereby saving network transmission resources.

In one embodiment, the foregoing at least two subframes may include a second subframe of a second length, where the second length is N times the first length, and N is a positive integer greater than 1.

When the second subframe is mapped to the frequency band with the first subcarrier spacing, the second subframe includes at least N symbols.

When the second subframe is mapped to the frequency band with the second subcarrier spacing, the second subframe includes at least 2N symbols.

In one embodiment, the foregoing second subframe may be configured in the data frame. A length of the foregoing second subframe is N times a length of the foregoing first subframe. In this way, a high-capacity or high-mobility service may be transmitted. For example, when the second subframe is mapped to the frequency band with the 15 kHz subcarrier spacing, the second subframe includes N symbols; when the second subframe is mapped to the frequency band with the 30 kHz subcarrier spacing, the second subframe includes 2N symbols; and when the second subframe is mapped to the frequency band with the 60 kHz subcarrier spacing, the second subframe includes 4N symbols.

In one embodiment, the foregoing at least two subframes may include a third subframe of a third length, where the third length is M×N times the first length, and M and N are positive integers greater than 1; or the foregoing at least two subframes may include a fourth subframe of a fourth length, where the fourth length is K×M×N times the first length, and K, M, and N are all positive integers greater than 1.

Figure 6:
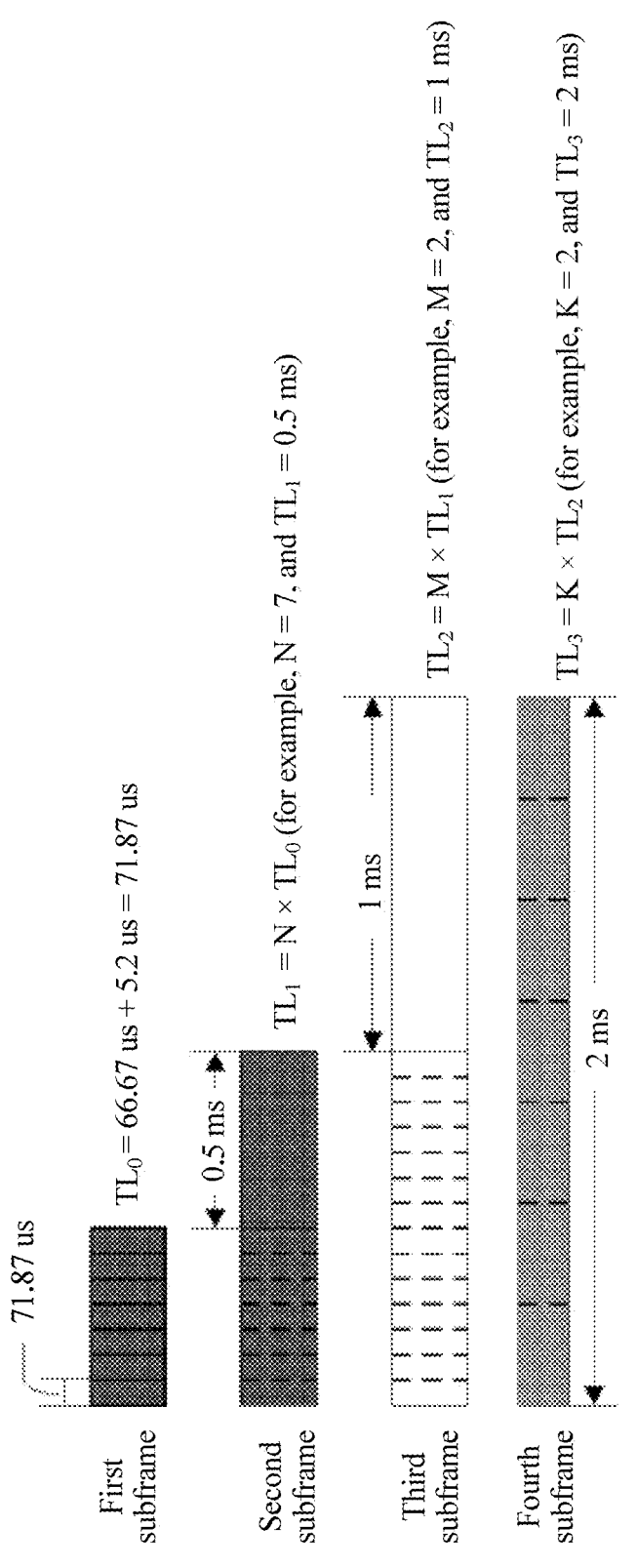
FIG. 6 is a schematic structural diagram of various subframes according to an embodiment of the present application.

For example, as shown in FIG. 6, the first length of the first subframe is $TL_0=66.67$ μs+5.2 μs=71.87 μs, the second length of the second subframe is $TL_1=N\times TL_0=0.5$ ms, the third length of the third subframe is $TL_2=M\times TL_1=1$ ms, and the fourth length of the fourth subframe is $TL_3=K\times TL_2=2$ ms. Certainly, only an example in which the first length is 71.87 μs is used herein.

In addition, in one embodiment, a quantity of symbols included in each subframe is directly proportional to a subcarrier spacing of a frequency band to which the subframe is mapped. That is, a larger subcarrier spacing indicates that more symbols are included in the subframe, and a smaller subcarrier spacing indicates that fewer symbols are included in the subframe.

In one embodiment, each subframe has a fixed length, and in this way, a larger subcarrier spacing indicates a narrower symbol width and a higher supportable mobility, and a smaller subcarrier spacing indicates a wider symbol width, a longer service distance of a user, and a larger coverage area. In addition, a longer subframe length indicates relatively high resource utilization efficiency. Therefore, the foregoing first subframe, second subframe, third subframe, and fourth subframe that are corresponding to different subcarrier spacings may adapt to different application scenarios and different service requirements.

Figures 7, 8:
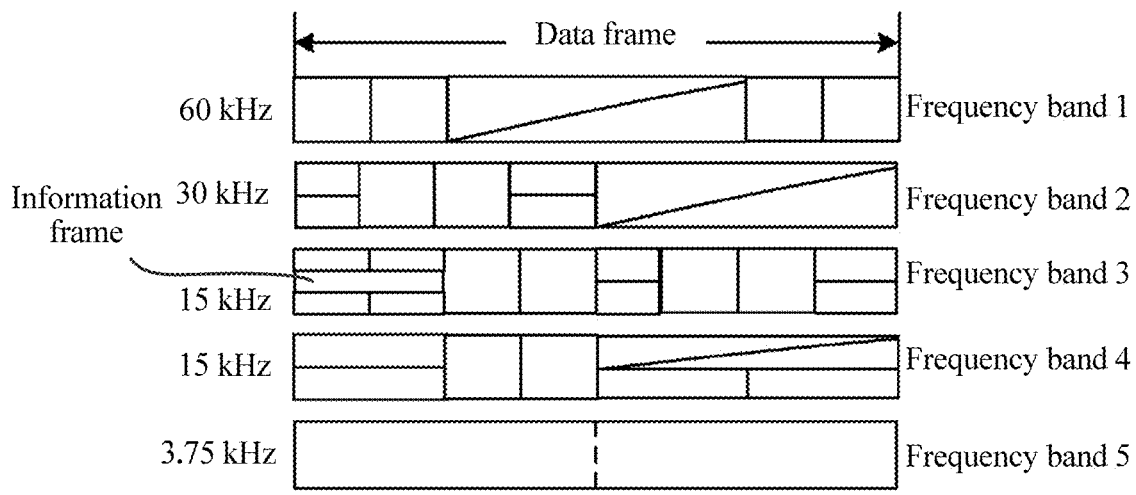
FIG. 7 is a schematic diagram of scenarios and services to which various subframes may be applied according to an embodiment of the present application.
FIG. 8 is a schematic diagram of data frame assembly according to an embodiment of the present application.

For example, the first subframe may be applicable to a low latency service, a subcarrier spacing configured in the second subframe may be applicable to a high-capacity or high-mobility service, the third subframe is applicable to a large packet transmission, a relatively small subcarrier spacing (for example, 3.75 kHz or 7.5 kHz) configured in the fourth subframe may be applicable to a small packet service that is not sensitive to a latency and that is in a massive connection scenario. For details, refer to FIG. 7. As shown in FIG. 7, when the first subframe is transmitted on an ultra-short TTI (Ultra-short TTI) frequency band or is transmitted on a frequency band with a 15, 30, or 60 kHz subcarrier spacing, the first subframe may be used to transmit a low latency (Low latency) service, or to transmit a critical MTC. When the second subframe is transmitted on a normal transmission (Normal Transmission) frequency band or on the frequency band with the 15, 30, or 60 kHz subcarrier spacing, the second subframe may be used to transmit a high capacity (High capacity) or high mobility (High mobility) service. When the third subframe is transmitted on a long TTI (Long TTI) frequency band or is transmitted on the frequency band with the 15, 30, or 60 kHz subcarrier spacing, the third subframe may be used to transmit the high capacity (High capacity) service. When the fourth subframe is transmitted on an ultra-narrowband (Ultra-Narrowband) frequency band or is transmitted on a frequency band with a 3.75 or 7.5 kHz subcarrier spacing, the fourth subframe may be used to transmit a small packet (Small packet) service and a massive connection (Massive connection) service.

In one embodiment, operation 101 may include:

configuring, by a transmitter, a data frame that is used for radio signal transmission and that is mapped to a target frequency band, where the data frame includes at least one of the following:

the first subframe, the second subframe, the third subframe, or the fourth subframe; and a subcarrier spacing of the target frequency band includes any one of the following:

the first subcarrier spacing, the second subcarrier spacing, a third subcarrier spacing, a fourth subcarrier spacing, or a fifth subcarrier spacing, where the third subcarrier spacing is greater than the second subcarrier spacing, the fourth subcarrier spacing is greater than the third subcarrier spacing, and the fifth subcarrier spacing is less than the first subcarrier spacing.

It can be learned from the foregoing description lengths of the first subframe, the second subframe, the third subframe, and the fourth subframe have a multiple relationship (e.g., can be multiples of one another). In this way, when the data frame is configured, a plurality of subframes in the first subframe, the second subframe, the third subframe, and the fourth subframe may be used for assembly, so as to be applicable to a current service and scenario.

In addition, it can be learned from the foregoing description about the target frequency band that an assembled data frame may be transmitted on frequency bands with different subcarrier spacings, and specifically, may be assembled according to an application scenario and a service requirement. For example, as shown in FIG. 8, a high system bandwidth may be divided, using a filter, into several frequency bands, which may be understood as several subbands (subband). A different subcarrier spacing is configured on each frequency band. For example, a subcarrier spacing of a frequency band 1 is 60 kHz; a subcarrier spacing of a frequency band 2 is 30 kHz; a subcarrier spacing of a frequency band 3 is 15 kHz, a subcarrier spacing of a frequency band 4 is 15 kHz; and a subcarrier spacing of a frequency band 5 is 3.75 kHz. In this way, in this embodiment, subframes of a same type may be configured on different frequency bands according to different application scenarios, and the different configuration frequency bands have different data structures. For example, the first subframe, the second subframe, the third subframe, and the fourth subframe may be configured on any one of the frequency band 1 to the frequency band 5. In addition, different types of subframes may be configured on a same frequency band according to different service requirements. For example, a data frame including the second subframe and the third subframe may be configured on the frequency band 1, a data frame including the first subframe, the second subframe, and the third subframe may be configured on the frequency band 2, a data frame including the first subframe and the second subframe may be configured on the frequency band 3, a data frame including the first subframe, the second subframe, and the third subframe may be configured on the frequency band 4, and a data frame including the fourth subframe may be configured on the frequency band 5. It should be noted that a location relationship between all subframes included in the data frame described herein may be flexibly adjusted according to a service requirement, that is, a location of each subframe may be configured according to a service requirement when the data frame is assembled.

In one embodiment, lengths of different subframes have a multiple relationship, and therefore, the data frame may be flexibly assembled according to a scenario and a service requirement.

In one embodiment, the subframes included in the foregoing data frame may be combined in a first combination manner, or the subframes included in the data frame may be combined in a second combination manner.

The first combination manner is different from the second combination manner. The first combination manner herein may be any combination manner applicable to the target frequency band. For example, the first combination manner may be a pre-specified combination manner, or the first combination manner may be a combination manner that is determined according to a current application scenario and based on a pre-obtained first combination rule, or the first combination manner may be a combination manner that is determined according to a currently transmitted service and based on the first combination rule. For example, for the frequency band 1 shown in FIG. 8, the first combination manner may be a combination of the second subframe and the third subframe on the frequency band 1, which is shown in FIG. 8; or for the frequency band 1 shown in FIG. 8, the first combination manner may be a combination of the first subframe and the second subframe, or the like. In addition to the foregoing first combination manner, the foregoing second combination manner may be any combination manner applicable to the target frequency band. For example, the second combination manner may be another pre-specified combination manner, or the second combination manner may be a combination manner that is determined according to a current application scenario and based on a pre-obtained second combination rule, or the second combination manner may be a combination manner that is determined according to a currently transmitted service and based on the second combination rule. For example, for the frequency band 1 shown in FIG. 8, the first combination manner may be a combination of the first subframe and the third subframe, or a combination of the first subframe, the second subframe, and the third subframe.

In addition, in one embodiment, the combination manner of the subframes included in the foregoing data frame may be dynamically specified by a control signal or may be specified by higher layer signaling.

The dynamically specifying by a control signal may be understood as that a receiver may be dynamically notified, using the control signal, of a combination manner of the subframes included in the data frame. In this way, the transmitter may flexibly configure the combination manner of the subframes in the data frame. Likewise, specifying by higher layer signaling may be understood as that the receiver may be notified, using the higher layer signaling, of the combination manner of the subframes included in the data frame. In this way, the transmitter may flexibly configure the combination manner of the subframes in the data frame. Therefore, the subframes in the data frame may be flexibly combined, so as to better meet various service requirements of the 5G mobile communication.

In addition, in one embodiment, the combination manner of the subframes included in the foregoing data frame may be negotiated in advance with the receiver.

In one embodiment, before the foregoing data frame is configured, the transmitter may negotiate in advance with the receiver about the combination manner of the subframes in the data frame. In this way, in a transmission process, there is no need to use a control signal or higher layer signaling to notify the receiver of the combination manner of the subframes in the data frame. Therefore, an extra control signal or extra higher layer signaling does not need to be transmitted during transmission, thereby saving network transmission resources.

In one embodiment, the foregoing data frame may be further used to transmit at least one of the following:

broadcast signaling, common control information, or a synchronization signal.

The broadcast signaling, the common control information, and the synchronization signal herein may be used to notify the receiver of the combination manner of the subframes in the foregoing data frame. When receiving the information, the receiver obtains a configuration manner of the data frame from the information. In this way, the transmitter may flexibly configure the combination manner of the subframes in the data frame. Regardless of a combination manner that is configured, only the receiver is notified of the combination manner, and the receiver may identify each subframe in the combination manner. For example, the frequency band 3 shown in FIG. 8 includes an information frame. The information frame may be used to transmit at least one of the broadcast signaling, the common control information, or the synchronization signal.

Figure 9:
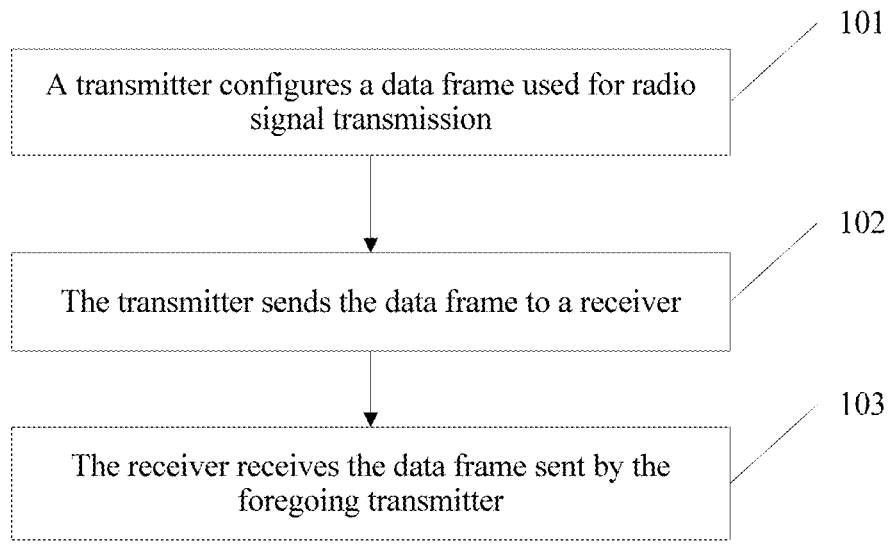
FIG. 9 is a schematic flowchart of another data frame implementation method according to an embodiment of the present application.

In one embodiment, as shown in FIG. 9, the foregoing method may further include the following operations:

In operation 102, the transmitter sends the data frame to a receiver.

In operation 103, the receiver receives the data frame sent by the foregoing transmitter.

The foregoing data frame received by the receiver may include at least two subframes, and each subframe has a fixed length, and therefore, the foregoing data frame may be mapped to at least two frequency bands with different subcarrier spacings, and a quantity of symbols included in each subframe is corresponding to a subcarrier spacing of a frequency band to which the subframe is mapped. In this way, the data frame received by the receiver can meet various service requirements of the 5G mobile communication and improve a service level of the 5G mobile communication of the receiver.

In one embodiment, operation 103 may include:

receiving, by the receiver, the data frame sent by the transmitter on a target frequency band.

For structures and combination manners of the subframes in the foregoing data frame received by the receiver, refer to description about sending of the foregoing data frame by the transmitter in this embodiment. Repeated description is not provided herein.

In addition, the subframes in the data frame received by the receiver may be flexibly combined. In this way, the data frame received by the receiver is more applicable to a current scenario and a current service of the receiver, so as to better meet 5G service requirements.

In addition, in one embodiment, when the combination manner of the subframes included in the foregoing data frame is dynamically specified by the control signal or is specified by the higher layer signaling, the foregoing receiver may obtain the combination manner of the subframes in the foregoing data frame by receiving the control signal or the higher layer signaling sent by the transmitter, so as to identify each flexibly combined subframe.

If the combination manner of the subframes included in the foregoing data frame is negotiated in advance with the transmitter, when receiving the foregoing data frame, the receiver may identify each subframe according to a combination manner negotiated in advance.

In addition, in one embodiment, the foregoing data frame may be further used to transmit at least one of the following:

broadcast signaling, common control information, or a synchronization signal.

The receiver may obtain the combination manner of the subframes in the foregoing data frame using at least one of the broadcast signaling, the common control information, or the synchronization signal that are transmitted by the foregoing data frame.

It should be noted that in one embodiment, the foregoing first subframe, second subframe, third subframe, and fourth subframe may each represent a different type of subframes without being limited to represent a single subframe.

In one embodiment, to meet various and divergent service requirements of a 5G system, a method in which a data frame structure may be flexibly assembled is provided. A fixed-length subframe can meet a low latency requirement in different scenarios, and lengths of subframes have an inherent multiple relationship, and therefore the subframes can be easily assembled into a frame. In addition, this embodiment provides a fixed correspondence between a TTI length and a subcarrier spacing. A quantity of symbols in each subframe may be flexibly changed according to a subcarrier spacing of a configured frequency band, and subframes in each frame may be flexibly assembled, thereby meeting various special service requirements at a same time.

In one embodiment, the foregoing transmitter may be any transmitter having a function of configuring a data frame, such as a base station, an access point device, a gateway device, a server, or a terminal. The terminal may include a handheld device, a vehicular device, a wearable device, a computing device, or other processing devices connected to a wireless modem, and user equipment (UE), mobile station (MS), terminal, and terminal equipment that are in various forms, and the like. However, the foregoing receiver may be a device receiving a data frame, for example, a terminal.

In one embodiment, the data frame used for radio signal transmission is configured, where the data frame includes at least two subframes, each subframe has a fixed length, the at least two subframes may be mapped to at least two frequency bands with different subcarrier spacings, and a quantity of symbols included in each subframe is corresponding to a subcarrier spacing of a frequency band to which the subframe is mapped. The foregoing data frame may be mapped to the at least two frequency bands with different subcarrier spacings, and a quantity of symbols included in each subframe is corresponding to a subcarrier spacing of a frequency band to which the subframe is mapped. In this way, the data frame can meet various service requirements of the 5G mobile communication and improve the service level of the 5G mobile communication.

The following describes apparatus embodiments of the present application. The apparatus embodiments of the present application are used to perform the methods implemented in embodiments of the present application. For ease of description, only parts related to embodiments of the present application are shown. For technical details that are not disclosed, refer to above embodiments of the present application.

Figure 10:
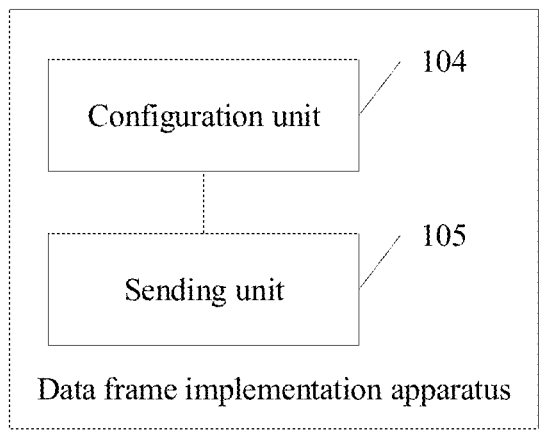
FIG. 10 is a schematic structural diagram of a data frame implementation apparatus according to an embodiment of the present application.

Referring to FIG. 10, FIG. 10 is a schematic structural diagram of a data frame implementation apparatus according to an embodiment of the present application. As shown in FIG. 10, the apparatus includes:

a configuration unit 104, configured to configure a data frame used for radio signal transmission, where the data frame includes at least two subframes, each subframe has a fixed length, the at least two subframes may be mapped to at least two frequency bands with different subcarrier spacings, and a quantity of symbols included in each subframe is corresponding to a subcarrier spacing of a frequency band to which the subframe is mapped.

In one embodiment, the foregoing at least two subframes may include a first subframe of a first length.

When the first subframe is mapped to a frequency band with a first subcarrier spacing, the first subframe includes at least one symbol.

When the first subframe is mapped to a frequency band with a second subcarrier spacing, the first subframe includes at least two symbols, and the second subcarrier spacing is greater than the first subcarrier spacing.

In one implementation, when the first subframe is mapped to frequency bands with different subcarrier spacings, a quantity of symbols included in the first subframe may be different, thereby meeting various service requirements of 5G mobile communication.

In one embodiment, the at least two subframes may include a second subframe of a second length, where the second length is N times the first length, and N is a positive integer greater than 1.

When the second subframe is mapped to the frequency band with the first subcarrier spacing, the second subframe includes at least N symbols.

When the second subframe is mapped to the frequency band with the second subcarrier spacing, the second subframe includes at least 2N symbols.

In one implementation, the length of the second subframe is N times the length of the first subframe. In this way, the first subframe and the second subframe may be flexibly assembled, so as to be mapped to different frequency bands.

In one embodiment, a quantity of symbols included in each subframe may be directly proportional to a subcarrier spacing of a frequency band to which the subframe is mapped.

In one embodiment, a quantity of symbols included in each subframe is directly proportional to a subcarrier spacing of a frequency band to which the subframe is mapped. In this way, subframes can be more flexibly configured as a data frame, so as to better meet various service requirements of the 5G mobile communication.

In one embodiment, the at least two subframes may include a third subframe of a third length, where the third length is M×N times the first length, and M and N are positive integers greater than 1; or the at least two subframes may include a fourth subframe of a fourth length, where the fourth length is K×M×N times the first length, and K, M, and N are all positive integers greater than 1.

In one implementation, lengths of the third subframe and the fourth subframe have a multiple relationship with lengths of the first subframe and the second subframe. In this way, the data frame is more flexibly assembled for meeting different service requirements.

In one embodiment, the configuration unit 104 may be configured to configure the data frame that is used for radio signal transmission and that is mapped to a target frequency band, where the data frame includes at least one of the following:

the first subframe, the second subframe, the third subframe, or the fourth subframe; and a subcarrier spacing of the target frequency band includes any one of the following:

the first subcarrier spacing, the second subcarrier spacing, a third subcarrier spacing, a fourth subcarrier spacing, or a fifth subcarrier spacing, where the third subcarrier spacing is greater than the second subcarrier spacing, the fourth subcarrier spacing is greater than the third subcarrier spacing, and the fifth subcarrier spacing is less than the first subcarrier spacing.

In one implementation, the data frame may be mapped to frequency bands with different subcarrier spacings, and the data frame may be flexibly assembled for meeting various service requirements of the 5G mobile communication.

In one implementation, the subframes included in the foregoing data frame may be combined in a first combination manner, or the subframes included in the data frame may be combined in a second combination manner; where the first combination manner is different from the second combination manner.

In one implementation, the subframes in the data frame may be combined in different combination manners for being applicable to different scenarios and different services.

In one embodiment, a combination manner of the subframes included in the foregoing data frame may be dynamically specified by a control signal or may be specified by higher layer signaling; or a combination manner of the subframes included in the data frame may be negotiated in advance with a receiver.

In one implementation, the combination manner of the subframes included in the data frame is dynamically specified by the control signal or is specified by the higher layer signaling. Therefore, the subframes in the data frame may be flexibly combined, so as to better meet various service requirements of the 5G mobile communication. In addition, in some embodiments, the combination manner of the subframes in the data frame may be negotiated in advance with the receiver. In this way, an extra control signal or extra higher layer signaling does not need to be transmitted during transmission, thereby saving network transmission resources.

In one implementation, the foregoing data frame may be further used to transmit at least one of the following:

broadcast signaling, common control information, or a synchronization signal.

In one implementation, the receiver may be notified of the combination manner of the subframes in the foregoing data frame using at least one of the broadcast signaling, the common control information, or the synchronization signal.

In one embodiment, the foregoing apparatus may further include:

a sending unit 105, configured to send the data frame to a receiver.

In one embodiment, the foregoing apparatus may be any transmitter having a function of configuring a data frame. The transmitter may be a transmitter described in the embodiment shown in FIG. 1, and any implementations of the transmitter described in the embodiment shown in FIG. 1 may be implemented by the above apparatus according to some embodiments.

In one embodiment, the data frame used for radio signal transmission is configured, where the data frame includes at least two subframes, each subframe has a fixed length, the at least two subframes may be mapped to at least two frequency bands with different subcarrier spacings, and a quantity of symbols included in each subframe is corresponding to a subcarrier spacing of a frequency band to which the subframe is mapped. The foregoing data frame may be mapped to the at least two frequency bands with different subcarrier spacings, and a quantity of symbols included in each subframe is corresponding to a subcarrier spacing of a frequency band to which the subframe is mapped. In this way, the data frame can meet various service requirements of the 5G mobile communication and improve a service level of the 5G mobile communication.

Figure 11:
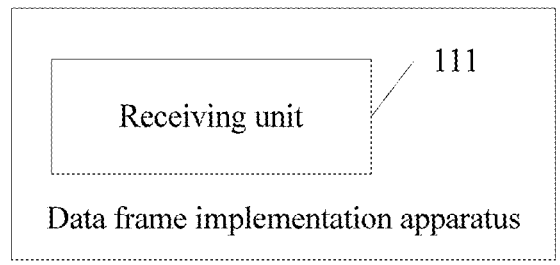
FIG. 11 is a schematic structural diagram of another data frame implementation apparatus according to an embodiment of the present application.

Referring to FIG. 11, FIG. 11 is a schematic structural diagram of another data frame implementation apparatus according to an embodiment of the present application. As shown in FIG. 11, the apparatus includes a receiving unit 111, where the receiving unit 111 is configured to receive a data frame sent by a transmitter, the data frame includes at least two subframes, each subframe has a fixed length, the at least two subframes may be mapped to at least two frequency bands with different subcarrier spacings, and a quantity of symbols included in each subframe is corresponding to a subcarrier spacing of a frequency band to which the subframe is mapped.

In one embodiment, the foregoing at least two subframes may include a first subframe of a first length.

When the first subframe is mapped to a frequency band with a first subcarrier spacing, the first subframe includes at least one symbol.

When the first subframe is mapped to a frequency band with a second subcarrier spacing, the first subframe includes at least two symbols, and the second subcarrier spacing is greater than the first subcarrier spacing.

In one embodiment, the foregoing at least two subframes may include a second subframe of a second length, where the second length is N times the first length, and N is a positive integer greater than 1.

When the second subframe is mapped to the frequency band with the first subcarrier spacing, the second subframe includes at least N symbols.

When the second subframe is mapped to the frequency band with the second subcarrier spacing, the second subframe includes at least 2N symbols.

In one embodiment, a quantity of symbols included in each subframe may be directly proportional to a subcarrier spacing of a frequency band to which the subframe is mapped.

In one embodiment, the at least two subframes may include a third subframe of a third length, where the third length is M×N times the first length, and M and N are positive integers greater than 1; or the at least two subframes may include a fourth subframe of a fourth length, where the fourth length is K×M×N times the first length, and K, M, and N are all positive integers greater than 1.

In one embodiment, the receiving unit 111 may be configured to receive the data frame sent by the transmitter on a target frequency band, where the data frame includes at least one of the following:

the first subframe, the second subframe, the third subframe, or the fourth subframe; and a subcarrier spacing of the target frequency band includes any one of the following:

the first subcarrier spacing, the second subcarrier spacing, a third subcarrier spacing, a fourth subcarrier spacing, or a fifth subcarrier spacing, where the third subcarrier spacing is greater than the second subcarrier spacing, the fourth subcarrier spacing is greater than the third subcarrier spacing, and the fifth subcarrier spacing is less than the first subcarrier spacing.

In one embodiment, subframes included in the foregoing data frame may be combined in a first combination manner, or the subframes included in the data frame may be combined in a second combination manner; where the first combination manner is different from the second combination manner.

In one embodiment, a combination manner of the subframes included in the data frame may be dynamically specified by a control signal or may be specified by higher layer signaling; or a combination manner of the subframes included in the data frame may be negotiated in advance with the transmitter.

In one embodiment, the foregoing data frame may be further used to transmit at least one of the following:

broadcast signaling, common control information, or a synchronization signal.

In one embodiment, the foregoing apparatus may be applied to the receiver described in the embodiment shown in FIG. 1, and any implementation of the receiver described in the embodiment shown in FIG. 1 may be implemented by the apparatus in this embodiment.

In one embodiment, the data frame that is sent by the transmitter and that is used for radio signal transmission is received, where the data frame includes at least two subframes, each subframe has a fixed length, the at least two subframes may be mapped to at least two frequency bands with different subcarrier spacings, and a quantity of symbols included in each subframe is corresponding to a subcarrier spacing of a frequency band to which the subframe is mapped. The foregoing data frame may be mapped to the at least two frequency bands with different subcarrier spacings, and a quantity of symbols included in each subframe is corresponding to a subcarrier spacing of a frequency band to which the subframe is mapped. In this way, the data frame can meet various service requirements of 5G mobile communication and improve a service level of the 5G mobile communication.

Figure 12:
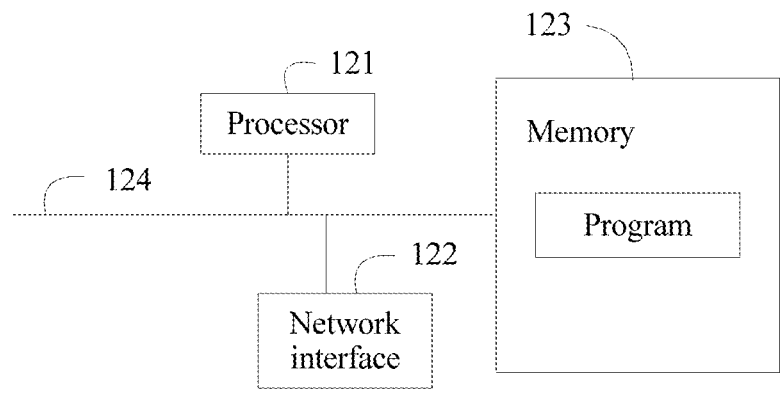
FIG. 12 is a schematic structural diagram of another data frame implementation apparatus according to an embodiment of the present application.

Referring to FIG. 12, FIG. 12 is a schematic structural diagram of another data frame implementation apparatus according to an embodiment of the present application. As shown in FIG. 12, the apparatus includes a processor 121, a network interface 122, a memory 123, and a communications bus 124. The communications bus 124 is configured to implement connection and communication between the processor 121, the network interface 122, and the memory 123. The processor 121 executes a program stored in the memory 123 to implement the following method:

configuring a data frame used for radio signal transmission, where the data frame includes at least two subframes, each subframe has a fixed length, the at least two subframes may be mapped to at least two frequency bands with different subcarrier spacings, and a quantity of symbols included in each subframe is corresponding to a subcarrier spacing of a frequency band to which the subframe is mapped.

In one embodiment, the at least two subframes may include a first subframe of a first length.

When the first subframe is mapped to a frequency band with a first subcarrier spacing, the first subframe includes at least one symbol.

When the first subframe is mapped to a frequency band with a second subcarrier spacing, the first subframe includes at least two symbols, and the second subcarrier spacing is greater than the first subcarrier spacing.

In one embodiment, the at least two subframes may include a second subframe of a second length, where the second length is N times the first length, and N is a positive integer greater than 1.

When the second subframe is mapped to the frequency band with the first subcarrier spacing, the second subframe includes at least N symbols.

When the second subframe is mapped to the frequency band with the second subcarrier spacing, the second subframe includes at least 2N symbols.

In one embodiment, a quantity of symbols included in each subframe may be directly proportional to a subcarrier spacing of a frequency band to which the subframe is mapped.

In one embodiment, the at least two subframes may include a third subframe of a third length, where the third length is M×N times the first length, and M and N are positive integers greater than 1; or the at least two subframes may include a fourth subframe of a fourth length, where the fourth length is K×M×N times the first length, and K, M, and N are all positive integers greater than 1.

In one embodiment, the program that is executed by the processor 121 and that configures the data frame used for radio signal transmission may include:

configuring a data frame that is used for radio signal transmission and that is mapped to a target frequency band, where the data frame includes at least one of the following:

the first subframe, the second subframe, the third subframe, or the fourth subframe; and a subcarrier spacing of the target frequency band includes any one of the following:

the first subcarrier spacing, the second subcarrier spacing, a third subcarrier spacing, a fourth subcarrier spacing, or a fifth subcarrier spacing, where the third subcarrier spacing is greater than the second subcarrier spacing, the fourth subcarrier spacing is greater than the third subcarrier spacing, and the fifth subcarrier spacing is less than the first subcarrier spacing.

In one embodiment, subframes included in the foregoing data frame may be combined in a first combination manner, or the subframes included in the data frame may be combined in a second combination manner; where the first combination manner is different from the second combination manner.

In one embodiment, a combination manner of the subframes included in the foregoing data frame may be dynamically specified by a control signal or may be specified by higher layer signaling; or a combination manner of the subframes included in the data frame may be negotiated in advance with a receiver.

In one embodiment, the foregoing data frame may be further used to transmit at least one of the following:

broadcast signaling, common control information, or a synchronization signal.

In one embodiment, the program executed by the processor 121 may further include:

sending the data frame to a receiver.

In one embodiment, the foregoing apparatus may be any transmitter having a function of configuring a data frame. The transmitter may be a transmitter described in the embodiment shown in FIG. 1, and any implementation of the transmitter described in the embodiment shown in FIG. 1 may be implemented by the apparatus in this embodiment.

In one embodiment, the data frame used for radio signal transmission is configured, where the data frame includes at least two subframes, each subframe has a fixed length, the at least two subframes may be mapped to at least two frequency bands with different subcarrier spacings, and a quantity of symbols included in each subframe is corresponding to a subcarrier spacing of a frequency band to which the subframe is mapped. The foregoing data frame may be mapped to the at least two frequency bands with different subcarrier spacings, and a quantity of symbols included in each subframe is corresponding to a subcarrier spacing of a frequency band to which the subframe is mapped. In this way, the data frame can meet various service requirements of 5G mobile communication and improve a service level of the 5G mobile communication.

Figure 13:
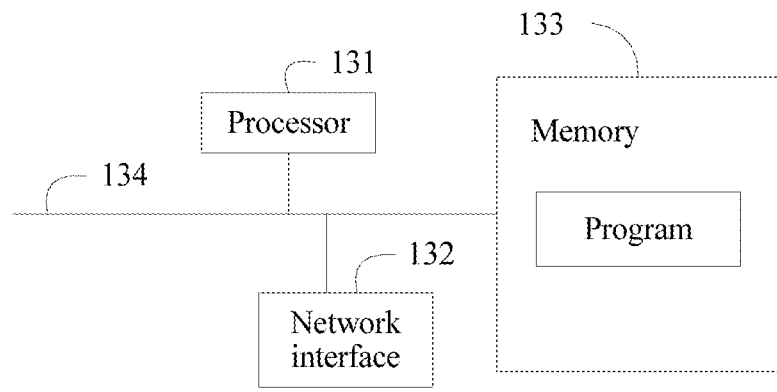
FIG. 13 is a schematic structural diagram of another data frame implementation apparatus according to an embodiment of the present application.

Referring to FIG. 13, FIG. 13 is a schematic structural diagram of another data frame implementation apparatus according to an embodiment of the present application. As shown in FIG. 13, the apparatus includes a processor 131, a network interface 132, a memory 133, and a communications bus 134. The communications bus 134 is configured to implement connection and communication between the processor 131, the network interface 132, and the memory 133. The processor 131 executes a program stored in the memory 133 to implement the following method:

receiving a data frame sent by a transmitter, where the data frame includes at least two subframes, each subframe has a fixed length, the at least two subframes may be mapped to at least two frequency bands with different subcarrier spacings, and a quantity of symbols included in each subframe is corresponding to a subcarrier spacing of a frequency band to which the subframe is mapped.

In one embodiment, the foregoing at least two subframes may include a first subframe of a first length.

When the first subframe is mapped to a frequency band with a first subcarrier spacing, the first subframe includes at least one symbol.

When the first subframe is mapped to a frequency band with a second subcarrier spacing, the first subframe includes at least two symbols, and the second subcarrier spacing is greater than the first subcarrier spacing.

In one embodiment, the foregoing at least two subframes may include a second subframe of a second length, where the second length is N times the first length, and N is a positive integer greater than 1.

When the second subframe is mapped to the frequency band with the first subcarrier spacing, the second subframe includes at least N symbols.

When the second subframe is mapped to the frequency band with the second subcarrier spacing, the second subframe includes at least 2N symbols.

In one embodiment, a quantity of symbols included in each subframe may be directly proportional to a subcarrier spacing of a frequency band to which the subframe is mapped.

In one embodiment, the foregoing at least two subframes may include a third subframe of a third length, where the third length is M×N times the first length, and M and N are positive integers greater than 1; or the at least two subframes may include a fourth subframe of a fourth length, where the fourth length is K×M×N times the first length, and K, M, and N are all positive integers greater than 1.

In one embodiment, the program that is executed by the processor 131 and that receives the data frame sent by the transmitter may include:

receiving the data frame sent by the transmitter on a target frequency band, where the data frame includes at least one of the following:

the first subframe, the second subframe, the third subframe, or the fourth subframe; and a subcarrier spacing of the target frequency band includes any one of the following:

the first subcarrier spacing, the second subcarrier spacing, a third subcarrier spacing, a fourth subcarrier spacing, or a fifth subcarrier spacing, where the third subcarrier spacing is greater than the second subcarrier spacing, the fourth subcarrier spacing is greater than the third subcarrier spacing, and the fifth subcarrier spacing is less than the first subcarrier spacing.

In one embodiment, subframes included in the foregoing data frame may be combined in a first combination manner, or the subframes included in the data frame may be combined in a second combination manner; where the first combination manner is different from the second combination manner.

In one embodiment, a combination manner of the subframes included in the foregoing data frame may be dynamically specified by a control signal or may be specified by higher layer signaling; or a combination manner of the subframes included in the data frame may be negotiated in advance with the transmitter.

In one embodiment, the foregoing data frame may be further used to transmit at least one of the following:

broadcast signaling, common control information, or a synchronization signal.

In one embodiment, the foregoing apparatus may be applied to the receiver described in the embodiment shown in FIG. 1, and any implementation of the receiver described in the embodiment shown in FIG. 1 may be implemented by the apparatus in this embodiment.

In one embodiment, the data frame that is sent by the transmitter and that is used for radio signal transmission is received, where the data frame includes at least two subframes, each subframe has a fixed length, the at least two subframes may be mapped to at least two frequency bands with different subcarrier spacings, and a quantity of symbols included in each subframe is corresponding to a subcarrier spacing of a frequency band to which the subframe is mapped. The foregoing data frame may be mapped to the at least two frequency bands with different subcarrier spacings, and a quantity of symbols included in each subframe is corresponding to a subcarrier spacing of a frequency band to which the subframe is mapped. In this way, the data frame can meet various service requirements of 5G mobile communication and improve a service level of the 5G mobile communication.

A person of ordinary skill in the art may understand that all or some of the processes of the methods in the embodiments may be implemented by a computer program instructing relevant hardware. The program may be stored in a computer readable storage medium. When the program runs, the processes of the methods in the embodiments are performed. The foregoing storage medium may include: a magnetic disc, an optical disc, a read-only memory (ROM), or a random access memory (RAM).

What are disclosed above are merely example embodiments of the present application, and certainly are not intended to limit the protection scope of the present application. Therefore, equivalent variations made in accordance with the claims of the present application shall fall within the scope of the present application.

What is claimed is:

1. A data frame implementation method, comprising:
configuring a data frame used for radio signal transmission, wherein the data frame comprises at least two subframes, each subframe has a fixed length, the at least two subframes comprises a first subframe of a first length and a second subframe of a second length different from the first length, the at least two subframes are mapped to at least two frequency bands with different subcarrier spacings, and a quantity of symbols comprised in each subframe corresponds to a subcarrier spacing of a frequency band to which the subframe is mapped; and
transmitting the data frame to a receiver over a network.

2. The method according to claim 1, wherein
when the first subframe is mapped to a frequency band with a first subcarrier spacing, the first subframe comprises at least one symbol; and
when the first subframe is mapped to a frequency band with a second subcarrier spacing, the first subframe comprises at least two symbols, and the second subcarrier spacing is greater than the first subcarrier spacing.

3. The method according to claim 2, wherein the second length is N times the first length, and N is a positive integer greater than 1;
when the second subframe is mapped to the frequency band with the first subcarrier spacing, the second subframe comprises at least N symbols; and
when the second subframe is mapped to the frequency band with the second subcarrier spacing, the second subframe comprises at least 2N symbols.

4. The method according to claim 1, wherein the quantity of symbols comprised in each subframe is directly proportional to a subcarrier spacing of a frequency band to which the subframe is mapped.

5. The method according to claim 2, wherein the at least two subframes comprise a third subframe of a third length, wherein the third length is M×N times the first length, and M and N are positive integers greater than 1; or
the at least two subframes comprise a fourth subframe of a fourth length, wherein the fourth length is K×M×N times the first length, and K, M, and N are all positive integers greater than 1.

6. The method according to claim 5, wherein configuring a data frame used for radio signal transmission comprises:
configuring a data frame that is used for radio signal transmission and that is mapped to a target frequency band, wherein the data frame comprises at least one of the following:
the first subframe, the second subframe, the third subframe, or the fourth subframe; and
a subcarrier spacing of the target frequency band comprises any one of the following:
the first subcarrier spacing, the second subcarrier spacing, a third subcarrier spacing, a fourth subcarrier spacing, or a fifth subcarrier spacing, wherein the third subcarrier spacing is greater than the second subcarrier spacing, the fourth subcarrier spacing is greater than the third subcarrier spacing, and the fifth subcarrier spacing is less than the first subcarrier spacing.

7. The method according to claim 6, wherein subframes comprised in the data frame are combined in a first combination manner, or the subframes comprised in the data frame are combined in a second combination manner; wherein
the first combination manner is different from the second combination manner.

8. The method according to claim 7, wherein a combination manner of the subframes comprised in the data frame is dynamically specified by a control signal or is specified by higher layer signaling; or
a combination manner of the subframes comprised in the data frame is negotiated in advance with a receiver.

9. The method according to claim 8, wherein the data frame is further used to transmit at least one of the following:
broadcast signaling, common control information, or a synchronization signal.

10. A data frame implementation apparatus, comprising:
a processor; wherein
the processor is configured to configure a data frame used for radio signal transmission, wherein the data frame comprises at least two subframes, each subframe has a fixed length, the at least two subframes comprises a first subframe of a first length and a second subframe of a second length different from the first length, the at least two subframes are mapped to at least two frequency bands with different subcarrier spacings, and a quantity of symbols comprised in each subframe corresponds to a subcarrier spacing of a frequency band to which the subframe is mapped, wherein the process is further configured to transmit the data frame to a receiver over a network.

11. The apparatus according to claim 10, wherein
when the first subframe is mapped to a frequency band with a first subcarrier spacing, the first subframe comprises at least one symbol; and
when the first subframe is mapped to a frequency band with a second subcarrier spacing, the first subframe comprises at least two symbols, and the second subcarrier spacing is greater than the first subcarrier spacing.

12. The apparatus according to claim 11, wherein the second length is N times the first length, and N is a positive integer greater than 1;
when the second subframe is mapped to the frequency band with the first subcarrier spacing, the second subframe comprises at least N symbols; and
when the second subframe is mapped to the frequency band with the second subcarrier spacing, the second subframe comprises at least 2N symbols.

13. The apparatus according to claim 10, wherein the quantity of symbols comprised in each subframe is directly proportional to a subcarrier spacing of a frequency band to which the subframe is mapped.

14. The apparatus according to claim 11, wherein the at least two subframes comprise a third subframe of a third length, wherein the third length is M×N times the first length, and M and N are positive integers greater than 1; or
the at least two subframes comprise a fourth subframe of a fourth length, wherein the fourth length is K×M×N times the first length, and K, M, and N are all positive integers greater than 1.

15. The apparatus according to claim 14, wherein the processor is configured to configure a data frame that is used for radio signal transmission and that is mapped to a target frequency band, wherein the data frame comprises at least one of the following:
the first subframe, the second subframe, the third subframe, or the fourth subframe; and
a subcarrier spacing of the target frequency band comprises any one of the following:
the first subcarrier spacing, the second subcarrier spacing, a third subcarrier spacing, a fourth subcarrier spacing, or a fifth subcarrier spacing, wherein the third subcarrier spacing is greater than the second subcarrier spacing, the fourth subcarrier spacing is greater than the third subcarrier spacing, and the fifth subcarrier spacing is less than the first subcarrier spacing.

16. The apparatus according to claim 15, wherein subframes comprised in the data frame are combined in a first combination manner, or the subframes comprised in the data frame are combined in a second combination manner; wherein
the first combination manner is different from the second combination manner.

17. The apparatus according to claim 16, wherein a combination manner of the subframes comprised in the data frame is dynamically specified by a control signal or is specified by higher layer signaling; or
a combination manner of the subframes comprised in the data frame is negotiated in advance with a receiver.

18. The apparatus according to claim 17, wherein the data frame is further used to transmit at least one of the following:
broadcast signaling, common control information, or a synchronization signal.

19. A non-transitory machine-readable medium having instructions stored therein, which when executed by one or more processors, cause the one or more processors to perform operations, the operations comprising:
configuring a data frame used for radio signal transmission, wherein the data frame comprises at least two subframes, each subframe has a fixed length, the at least two subframes comprises a first subframe of a first length and a second subframe of a second length different from the first length, the at least two subframes are mapped to at least two frequency bands with different subcarrier spacings, and a quantity of symbols comprised in each subframe corresponds to a subcarrier spacing of a frequency band to which the subframe is mapped; and
transmitting the data frame to a receiver over a network.

20. The non-transitory machine-readable medium of 19, wherein
when the first subframe is mapped to a frequency band with a first subcarrier spacing, the first subframe comprises at least one symbol; and
when the first subframe is mapped to a frequency band with a second subcarrier spacing, the first subframe comprises at least two symbols, and the second subcarrier spacing is greater than the first subcarrier spacing.

* * * * *